United States Patent
Zhu et al.

(10) Patent No.: US 10,947,836 B2
(45) Date of Patent: Mar. 16, 2021

(54) DEVICE AND METHOD FOR MEASURING OVERBURDEN OF INJECTED GAS IN CYCLIC GAS INJECTION DEVELOPMENT OF CONDENSATE GAS RESERVOIR

(71) Applicant: UNIVERSITY OF SCIENCE AND TECHNOLOGY BEIJING, Beijing (CN)

(72) Inventors: Weiyao Zhu, Beijing (CN); Kun Huang, Beijing (CN); Jing Xia, Beijing (CN); Tongwen Jiang, Beijing (CN); Ming Yue, Beijing (CN); Kai Luo, Beijing (CN); Zhiyong Song, Beijing (CN); Baichuan Wang, Beijing (CN); Debin Kong, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 0 days.

(21) Appl. No.: 16/941,954

(22) Filed: Jul. 29, 2020

(65) Prior Publication Data
US 2020/0362689 A1 Nov. 19, 2020

(30) Foreign Application Priority Data
Aug. 6, 2019 (CN) .......................... 201910723041.6

(51) Int. Cl.
*G01N 11/00* (2006.01)
*E21B 47/06* (2012.01)
(Continued)

(52) U.S. Cl.
CPC .............. *E21B 47/06* (2013.01); *E21B 36/04* (2013.01); *E21B 41/00* (2013.01); *E21B 43/168* (2013.01);
(Continued)

(58) Field of Classification Search
CPC .......... G01N 7/10; G01N 11/00; G01N 11/02; G01N 15/00; G01N 2011/006; G01N 2015/0015
See application file for complete search history.

(56) References Cited

U.S. PATENT DOCUMENTS

| | | | |
|---|---|---|---|
| 2009/0306898 A1* | 12/2009 | Anschutz | G01N 3/10 702/11 |
| 2019/0360948 A1* | 11/2019 | Lee | G01N 33/24 |
| 2020/0249182 A1* | 8/2020 | Adebayo | G01N 24/081 |

FOREIGN PATENT DOCUMENTS

| | | | |
|---|---|---|---|
| CN | 202195975 U | | 4/2012 |
| CN | 204436354 U | * | 7/2015 |

(Continued)

OTHER PUBLICATIONS

English Translation of CN-204436354-U (Year: 2015).*
(Continued)

*Primary Examiner* — Alexander A Mercado
(74) *Attorney, Agent, or Firm* — IPro, PLLC

(57) ABSTRACT

The present invention provides a device and a method for measuring overburden of injected gas in cyclic gas injection development of condensate gas reservoir. The device comprises sand packed model and temperature control system. The temperature control system is nested outside the sand packed model. The sand packed model comprises sand pack cell, four gas inlets, four gas outlets, bracket, direction control component, rotating shaft, upper cover, lower cover, fixing bolts, two top pressuring inlets, pressure transmission rods, pressure transfer piston and multiple gas sampling ports. The sand pack cell can be filled with quartz sand of different particle size and composition, and the angle of the whole device is adjusted by the direction control component.

10 Claims, 7 Drawing Sheets

(51) Int. Cl.
  *E21B 36/04* (2006.01)
  *E21B 41/00* (2006.01)
  *E21B 43/16* (2006.01)
  *G01N 7/10* (2006.01)
  *G01N 11/02* (2006.01)
  *G01N 15/00* (2006.01)

(52) U.S. Cl.
  CPC ............... *G01N 7/10* (2013.01); *G01N 11/00* (2013.01); *G01N 11/02* (2013.01); *G01N 15/00* (2013.01); *G01N 2011/006* (2013.01); *G01N 2015/0015* (2013.01)

(56) References Cited

FOREIGN PATENT DOCUMENTS

| CN | 105259041 A | 1/2016 |
|---|---|---|
| CN | 106499371 A | 3/2017 |
| CN | 207908312 U | 9/2018 |
| KR | 20180104274 A | 9/2018 |
| WO | 2014011385 A1 | 1/2014 |

OTHER PUBLICATIONS

Numerical simulation on dry gas overlap in cycling gas injection development of condensate gas reservoirs; Yan Sun, Wei-yao Zhu, Bao-zhu Li, Jing Xia, Yu-wei Jiao, Kun Huang; Journal of China University of Petroleum, vol. 42 No. 2, Apr. 2018 ,p. 129-135.

Study on cyclic injection gas override in condensate gas reservoir; Yan Sun, Wei-yao Zhu, Jing Xia, Bao-zhu Li; IOP Conference Series: Earth and Environmental Science, vol. 121 No. 5, Dec. 2018, p. 1-7.

\* cited by examiner

DEVICE AND METHOD FOR MEASURING OVERBURDEN OF INJECTED GAS IN CYCLIC GAS INJECTION DEVELOPMENT OF CONDENSATE GAS RESERVOIR

TECHNICAL FIELD

The present invention relates to the technical field of oilfield exploitation, and is more particularly concerned with a device and a method for measuring overburden of injected gas in cyclic gas injection development of condensate gas reservoir.

BACKGROUND

Condensate gas reservoirs usually adopt the depletion development method. This kind of development method has low investment cost and high return, and is the main development method of condensate gas reservoirs in China. However, depletion development has the phenomena of rapid decline in oil and gas production and low recovery of condensate gas. It will also cause a large amount of condensate gas to be lost in the formation due to retrograde condensation, resulting in a waste of resources.

As a special kind of natural gas reservoir, condensate gas reservoir has a very important position in China's oil and gas industry. During the development process, as the formation pressure drops, retrograde condensation occurs, which turns the gas into liquid, and the retrograde condensate will block the seepage channel, forming a "liquid lock" phenomenon, and most of the gas will be trapped in the gas reservoir. In addition, retrograde condensed liquid will increase the possibility of gas channeling. Therefore, the development of condensate gas is usually carried out by means of gas injection and pressure maintenance. The injected gas can keep the pressure of condensate gas reservoir constant, thereby preventing the occurrence of retrograde condensation. However, after gas injection is used, due to the density difference between injected gas and condensate gas, the gas reservoir exhibits different gas-oil ratio changes and hydrocarbon component density differentiation on different production profiles. The displacement front of injected gas does not move vertically forward, but gradually accumulates in the high part of the formation to form a secondary gas cap. This phenomenon is also known as gravity tongue. The overburden of injected gas will cause premature breakthrough of the injected gas, so that most of the condensate gas will remain in the reservoir without being recovered, resulting in low displacement efficiency. There are many reasons for the overburden phenomenon. Through experiments, it is possible to study how to reduce the overburden degree of condensate gas, thereby improving the recovery efficiency of condensate gas.

SUMMARY

The present invention aims at providing a device and a method for measuring overburden of injected gas in cyclic gas injection development of condensate gas reservoir.

The device comprises a sand packed model, a temperature control system, universal wheels, a displacement pump, intermediate containers, valves, pressure gauges, a pressure pump, and back pressure valves; the temperature control system is nested outside the sand packed model; the sand packed model comprises a sand pack cell, a first gas inlet, a second gas inlet, a third gas inlet, a fourth gas inlet, a first gas outlet, a second gas outlet, a third gas outlet, a fourth gas outlet, a bracket, a direction control component, a rotating shaft, an upper cover, a lower cover, fixing bolts, a first top pressuring inlet, a second top pressuring inlet, pressure transmission rods, a pressure transfer piston and multiple gas sampling ports; the sand pack cell is arranged inside the sand packed model, and the first gas inlet, the second gas inlet, the third gas inlet and the fourth gas inlet are arranged on the left side of the sand packed model and are all communicated with the sand pack cell, and the first gas outlet, the second gas outlet, the third gas outlet and the fourth gas outlet are arranged on the right side of the sand packed model and are all communicated with the sand pack cell; the multiple gas sampling ports are arranged on the front side of the sand packed model and are all communicated with the sand pack cell; the upper cover and the lower cover are respectively fixed on the upper and lower parts of the sand packed model by fixing bolts, for sealing the upper and lower parts of the sand pack cell; the pressure transfer piston is arranged in the sand pack cell; the first top pressuring inlet and the second top pressuring inlet are arranged on the upper cover, pressurized gas is injected through the first top pressuring inlet and the second top pressuring inlet to promote the pressure transfer piston moves up and down to pressurize the quartz sand in the sand pack cell, and the pressure transmission rods are connected to the pressure transfer piston through the upper cover; the left and right sides of the main body of the sand packed model are connected to the bracket through a rotating shaft, and the rotating shaft is connected to the direction control component through a transmission member, the universal wheels are arranged at the bottom of the bracket.

The temperature control system comprises a heating plate, an insulating plate, an insulation material, and a temperature control unit; wherein, the heating plate is wrapped with an electric heating wire, the heating plate is sheathed on the outside of the sand packed model, the insulating plate is sheathed on the outside of the heating plate, and the insulation material is sheathed on the outside of the insulating plate; the temperature control unit is connected to the heating wire on the heating plate to control the temperature of the heating plate; and the insulating plate ensures the insulation of the heating plate to ensure safety, and the insulation material prevents temperature loss.

The main structure of the sand packed model is made of pressure-resistant alloy steel, and the pressure-resistant alloy steel has a pressure resistance of 70 MPa.

The transmission member is a gear box.

The number of the gas sampling ports is not less than 16.

The intermediate containers comprise a first intermediate container and a second intermediate container, and the valves comprise a first valve and a second valve, and the pressure gauges comprise an inlet pressure gauge and an outlet pressure gauge, and the first intermediate container is filled with condensate gas, and the second intermediate container is filled with injected gas; and the displacement pump is respectively connected with the inlet end of the first intermediate container and the inlet end of the second intermediate container, the outlet end of the first intermediate container is connected with the inlet end of the first valve, the outlet end of the second intermediate container is connected with the inlet end of the second valve, and the outlet ends of the first valve and the second valve are respectively connected with the first gas inlet, the second gas inlet, the third gas inlet and the fourth gas inlet through first pipeline, and the inlet pressure gauge is arranged on the first pipeline, and the first gas outlet, the second gas outlet, the third gas outlet and the fourth gas outlet are respectively connected with back pressure valves, which are configured to control the gas outflow rate at outlet ends; and back pressure valves are connected with the pressure pump through the second pipeline, and the outlet pressure gauge is arranged on the second pipeline.

The injected gas is one of carbon dioxide, nitrogen or methane.

The core of the measuring method is to measure the contents of the injected gas and the condensate gas at the multiple gas sampling ports, so as to analyze the gravity difference between the injected gas and the condensate gas. The method comprises following steps:

S1: determining the experimental pressure and temperature, and formulating the experimental scheme;

S2: checking the air tightness of the measuring device;

S3: scaling is performed on the permeability of each layer, the number of layers and the thickness of each layer in the actual formation to obtain the permeability K of each sand layer, the number of sand layers and the thickness of each sand layer in the sand packed model required by the experiment;

S4: filling the sand packed model according to the permeability K of each sand layer, the number of sand layers and the thickness of each sand layer obtained in S3;

S5: filling sand into the sand pack cell, filling the first layer of sand with the thickness determined by S4; injecting pressurization medium from the first top pressuring inlet and the second top pressuring inlet; pressurizing sand body inside the sand pack cell by the pressure transfer piston, wherein the pressurized pressure P needs to ensure that the permeability K of each sand layer is obtained; and after the thickness of the first layer of sand body in the sand pack cell reaches the experimentally designed thickness, processing the remaining sand layers according to the procedures of filling the first layer of sand;

S6: rotating direction control component and adjusting the angle of the sand packed model through the rotating shaft to simulate the real reservoir inclination angle;

S7: covering the upper cover, tightening fixing bolts, and testing the air tightness again;

S8: opening the temperature control system, adjusting the temperature through the temperature control unit, and heating the measuring device, wherein the heating temperature range is 0° C. to 100° C.;

S9: saturating the experimental gas, turning on the displacement pump, opening the first valve, and injecting the condensate gas from the first intermediate container into the sand packed model; and to ensure complete saturation, injecting the gas from the first gas inlet, the second gas inlet, the third gas inlet and the fourth gas inlet at the same time with a constant injection speed, meanwhile, detecting pressure change through pressure gauges, wherein the multiple gas sampling ports are used as pressure detection ports; when the first gas outlet, the second gas outlet, the third gas outlet, and the fourth gas outlet start to flow out of gas, and the flow rate remains stable, increasing the pressure of the back pressure valve and increasing the pressure of the gas inlets until the outlet gas flow rate continues to remain stable; repeating the above process until the pressure detected by the pressure gauge rises to the set experimental pressure; after reaching the experimental pressure, closing the back pressure valve, the inlets pressure maintains constant till detected pressures of multiple gas sampling ports are the same and all reach the experimental pressure, closing the first gas inlet, the second gas inlet, the third gas inlet and the fourth gas inlet, and stop injection;

S10: after saturating the condensate gas, making the system stand still for 6~8 hours, observing the temperature and pressure changes, adjusting the back pressure valve to release some gas if the cell pressure gets higher than the designed experimental pressure, and stop this step when the temperature and pressure reach the experimental pressure and temperature determined in S1;

S11: keeping only one of the multiple gas sampling ports as the pressure detection port, and the rest as gas sampling ports;

S12: carrying out the displacement experiment, closing the first valve, opening the second valve, and injecting the injection gas from the second intermediate container into the sand packed model, and in the experiment, the injection gas is injected at a constant speed, the injection speed is 0.1 ml/min-20 ml/min;

S13: during the displacement process, taking samples from other gas sampling ports except the pressure detection port every 2 minutes, and it is noted that the sampled gas is a mixture of injected gas and original condensate gas. Then chromatographic analysis is performed to obtain the gas composition of different sampling ports S14: processing the content data determined in S13 to obtain the component distribution of the injected gas at different parts and the component distribution of the condensed gas at different parts; and plotting the data into a cloud chart, and analyzing the migration mechanism through the gas composition at different times.

S2 is detailed as follows: firstly, connecting the first gas inlet, the second gas inlet, the third gas inlet and the fourth gas inlet of the sand packed model with a pressure pump, and closing the first gas outlet, the second gas outlet, the third gas outlet, the fourth gas outlet and the multiple gas sampling ports; then slowly injecting gas from the first gas inlet, the second gas inlet, the third gas inlet and the fourth gas inlet, and then closing the pressure pump to observe whether pressure drops occur; and when the pressure cannot remain stable, it means that air tightness is poor and measures needs to be taken to detect and eliminate leakage point; and when the air tightness is guaranteed, continue to increase pressure, and testing the air tightness at higher pressures; and this process continues until the test pressure is at least 5 MPa higher than the experiment pressure.

In S5, pressurization is achieved by multiple times, and after each pressurization, thickness of the sand layer is measured; and when the designed thickness is not achieved, the second pressurization is performed and the pressurization process is repeated until the thickness of the first layer in the cell meets the experimental design;

In S5, the top pressure P required to obtain the permeability K of each sand layer is obtained as follows:

S51: first obtaining the intermediate parameter a by formula (1), unit: m; wherein, K is the permeability of each sand layer, unit: m²; τ is tortuosity of quartz sand formation in the sand packed cell, tortuosity is the ratio of the actual flowing length of fluid through the pores to the apparent length of the rock, decimal; r is radius of quartz sand particles in sand layer, unit: m; wherein, K, τ and r are known parameters;

$$K = \frac{\left(1 - \frac{\frac{4\sqrt{2}}{3}\pi r^3 - 4\sqrt{2}\pi\left(3r - \frac{a}{2}\right)\left(\frac{a}{2}\right)^2}{(2r-a)^3}\right)\left(\frac{2r-a}{\sqrt{3}} - r\right)^2}{8\tau^2}; \quad (1)$$

S52: obtaining by formula (2), F is the average force applied to a single quartz sand particle, unit: N, wherein, E is elastic modulus of filled quartz sand, decimal; μ is Poisson's ratio of the quartz sand in sand layer, decimal; E and μ are known parameters;

$$a = \sqrt[3]{\frac{9}{16}\left(\frac{2}{r}\right)\left(2 \times \frac{1-\mu^2}{E}\right)^2 F^2} \; ; \qquad (2)$$

S53: obtaining P by formula (3), and unit is Pa;

$$F = P \times 2\sqrt{3} r^2 \qquad (3).$$

The beneficial effects of the above technical scheme of the present invention are as follows:

In the above scheme, the influence of different injection speeds, different injection gases, different pressures, different temperatures, and different inclinations on the injected gas overburden can be studied. The device has a simple structure and high experimental accuracy, and can generate meaningful results to provide theoretical instructions for field practice.

1—first gas inlet; 2—second gas inlet; 3—third gas inlet; 4—fourth gas inlet; 5—first gas outlet; 6—second gas outlet; 7—third gas outlet; 8—fourth gas outlet; 9—direction control component; 10—rotating shaft; 11—first top pressuring inlet; 12—second top pressuring inlet; 13—pressure transmission rod; 14—fixing bolt; 15—pressure transfer piston; 16—universal wheel; 17—bracket; 18—sand pack cell; 19—upper cover; 20—lower cover; 21—insulation material; 22—insulating plate; 23—heating plate; 24—temperature control unit; 25—displacement pump; 26—first intermediate container; 27—second intermediate container; 28—second valve; 29—first valve; 30—inlet pressure gauge; 31—pressure pump; 32—outlet pressure gauge; 33—back pressure valve.

DETAILED DESCRIPTION

In order to better illustrate the invention related technical problems, the technical scheme and advantages of the invention, the following will describe in detail with reference to the drawings and embodiments.

The present invention provides a device and a method for measuring overburden of injected gas in cyclic gas injection development of condensate gas reservoir.

Figure 2:
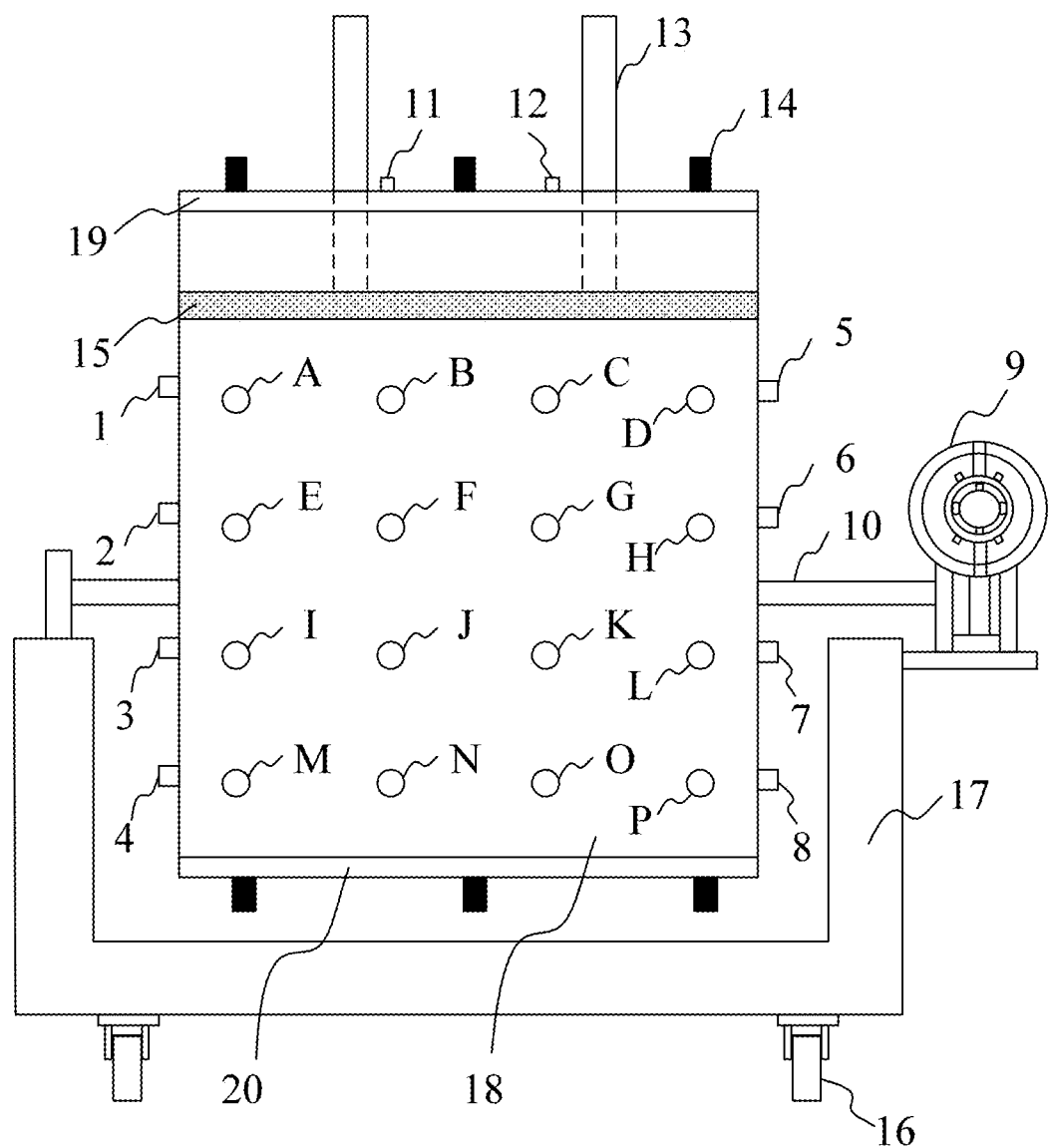
FIG. 2 is a schematic diagram of a sand packed model in a device for measuring overburden of injected gas in cyclic gas injection development of condensate gas reservoir according to one embodiment of the present invention.
Figure 3:
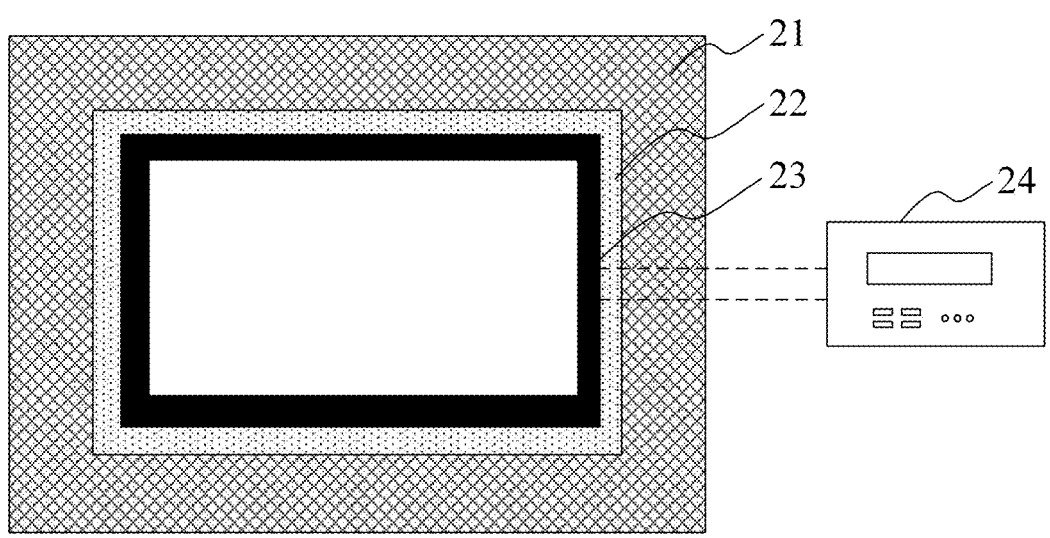
FIG. 3 is a schematic diagram of a temperature control system in a device for measuring overburden of injected gas in cyclic gas injection development of condensate gas reservoir according to one embodiment of the present invention.
Figure 4:
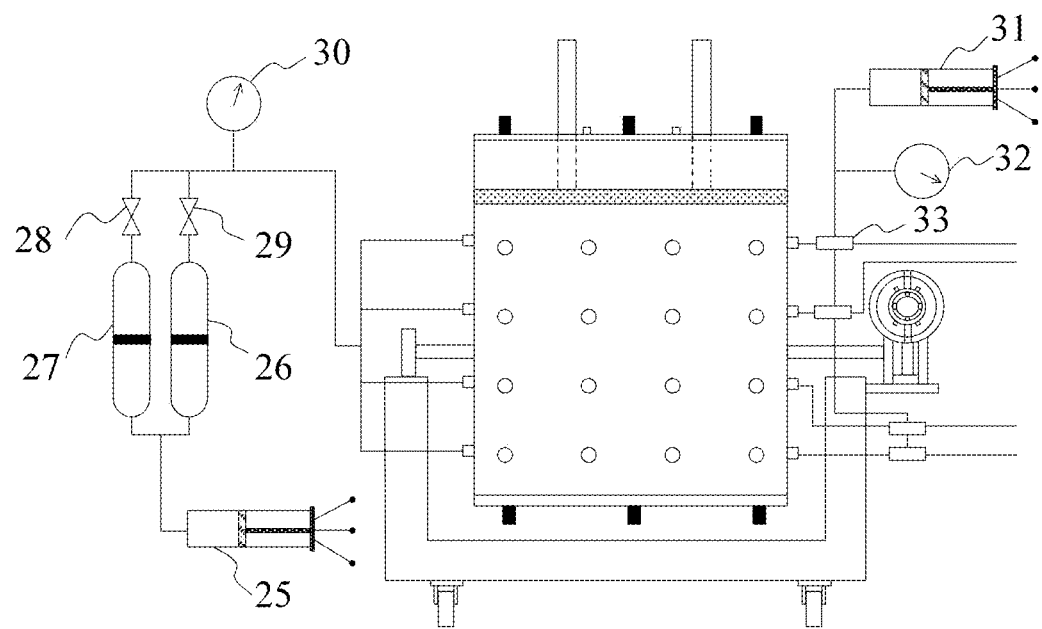
FIG. 4 is a connection diagram of a device for measuring overburden of injected gas in cyclic gas injection development of condensate gas reservoir according to one embodiment of the present invention.

As shown in FIG. 2, FIG. 3 and FIG. 4, the device comprises a sand packed model, a temperature control system, universal wheels 16, a displacement pump 25, intermediate containers, valves, pressure gauges, a pressure pump 31, and back pressure valves 33. The temperature control system is nested outside the sand packed model. The sand packed model comprises a sand pack cell 18, a first gas inlet 1, a second gas inlet 2, a third gas inlet 3, a fourth gas inlet 4, a first gas outlet 5, a second gas outlet 6, a third gas outlet 7, a fourth gas outlet 8, a bracket 17, a direction control component 9, a rotating shaft 10, an upper cover 19, a lower cover 20, fixing bolts 14, a first top pressuring inlet 11, a second top pressuring inlet 12, pressure transmission rods 13, a pressure transfer piston 15 and multiple gas sampling ports. The sand pack cell 18 is arranged inside the sand packed model, and the first gas inlet 1, the second gas inlet 2, the third gas inlet 3 and the fourth gas inlet 4 are arranged on the left side of the sand packed model and are all communicated with the sand pack cell 18, and the first gas outlet 5, the second gas outlet 6, the third gas outlet 7 and the fourth gas outlet 8 are arranged on the right side of the sand packed model and are all communicated with the sand pack cell 18, and multiple gas sampling ports are arranged on the front side of the sand packed model and are all communicated with the sand pack cell 18; and the upper cover 19 and the lower cover 20 are respectively fixed on the top and bottom of the sand packed model by fixing bolts 14, for sealing the upper and lower parts of the sand pack cell 18, and the pressure transfer piston 15 is arranged in the sand pack cell 18; and the first top pressuring inlet 11 and the second top pressuring inlet 12 are arranged on the upper cover 19, pressurized gas is injected through the first top pressuring inlet 11 and the second top pressuring inlet 12 to move the pressure transfer piston 15 up and down to pressurize the quartz sand in the sand pack cell 18, and the pressure transmission rods 13 are connected to the pressure transfer piston 15 through two holes in the upper cover 19; and the left and right sides of the main body of the sand packed model are connected to the bracket 17 through a rotating shaft 10, and the rotating shaft 10 is connected to the direction control component 9 through a transmission member, and universal wheels 16 are arranged at the bottom of the bracket 17.

As shown in FIG. 3, the temperature control system comprises a heating plate 23, an insulating plate 22, an insulation material 21, and a temperature control unit 24; wherein, the heating plate 23 is wrapped with an electric heating wire, the heating plate 23 is sheathed on the outside of the sand packed model, the insulating plate 22 is sheathed on the outside of the heating plate 23, and the insulation material 21 is sheathed on the outside of the insulating plate 22; the temperature control unit 24 is connected with the heating wire on the heating plate 23 to control the temperature of the heating plate 23; the insulating plate 22 ensures the insulation of the heating plate 23 to ensure safety, and the insulation material 21 prevents temperature loss.

The intermediate containers comprise a first intermediate container 26 and a second intermediate container 27; the valves comprise a first valve 29 and a second valve 28, and the pressure gauges comprise an inlet pressure gauge 30 and an outlet pressure gauge 32; the first intermediate container 26 is filled with condensate gas, and the second intermediate container 27 is filled with injected gas; the displacement pump 25 is respectively connected to the inlet end of the first intermediate container 26 and the inlet end of the second intermediate container 27, the outlet end of the first intermediate container 26 is connected with the inlet end of the first valve 29, the outlet end of the second intermediate container 27 is connected with the inlet end of the second valve 28, and the outlet ends of the first valve 29 and the second valve 28 are respectively connected with the first gas inlet 1, the second gas inlet 2, the third gas inlet 3 and the fourth gas inlet 4 through first pipeline; the inlet pressure gauge 30 is arranged on the first pipeline; the first gas outlet 5, the second gas outlet 6, the third gas outlet 7 and the fourth gas outlet 8 are respectively connected with back pressure valves 33, which are configured to control the gas flow rate at the outlet ends; and the back pressure valves 33 are connected with the pressure pump 31 through the second pipeline, and the outlet pressure gauge 32 is arranged on the second pipeline.

Figure 1:
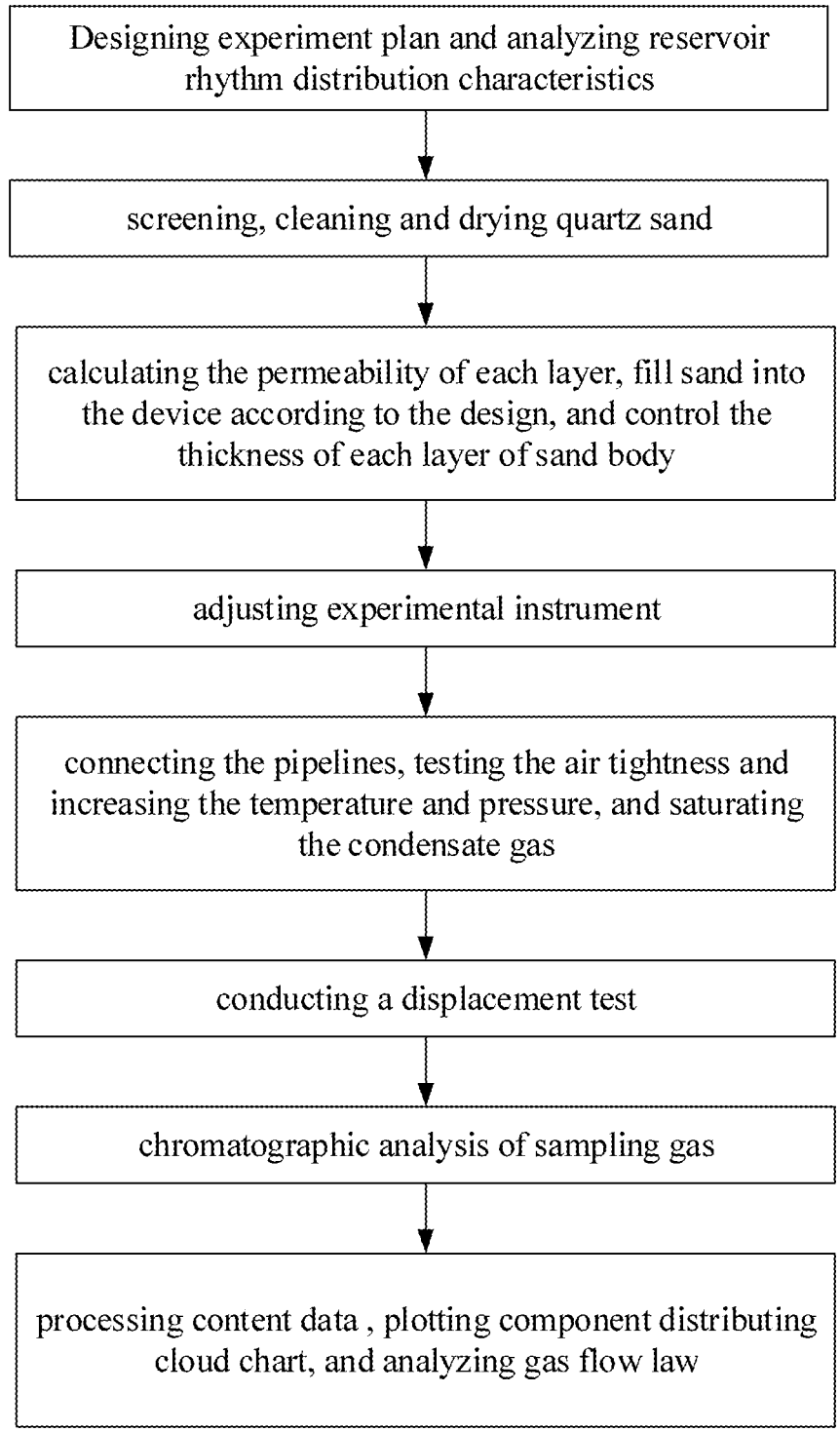
FIG. 1 is a process flow diagram of a method for measuring overburden of injected gas in cyclic gas injection development of condensate gas reservoir according to one embodiment of the present invention.

As shown in FIG. 1, the method of applying the measuring device comprises the following steps:

S1: determining the experimental pressure and temperature, and formulating the experimental scheme;

S2: checking the air tightness of the measuring device;

S3: scaling is performed on the permeability of each layer, the number of layers and the thickness of each layer in the actual formation to obtain the permeability K of each sand layer, the number of sand layers and the thickness of each sand layer in the sand packed model required by the experiment;

S4: filling the sand packed model according to the permeability K of each sand layer, the number of sand layers and the thickness of each sand layer obtained in S3;

S5: filling sand into the sand pack cell 18, filling the first layer of sand with the thickness determined by S4; injecting pressurization medium from the first top pressuring inlet 11 and the second top pressuring inlet 12; pressurizing sand body inside the sand pack cell 18 by the pressure transfer piston 15, wherein the pressurized pressure P needs to ensure that the permeability K of each sand layer is obtained; and after the thickness of the first layer of sand body in the sand pack cell 18 reaches the experimentally designed thickness, processing the remaining sand layers according to the procedures of filling the first layer of sand;

S6: rotating direction control component 9 and adjusting the angle of the sand packed model through the rotating shaft 10 to simulate the real reservoir inclination angle;

S7: covering the upper cover 19, tightening fixing bolts 14, and testing the air tightness again;

S8: opening the temperature control system, adjusting the temperature through the temperature control unit 24, and heating the measuring device, wherein the heating temperature range is 0° C. to 100° C.;

S9: saturating the experimental gas, turning on the displacement pump 25, opening the first valve 29, and injecting the condensate gas from the first intermediate container 26 into the sand packed model; and to ensure complete saturation, injecting the gas from the first gas inlet 1, the second gas inlet 2, the third gas inlet 3 and the fourth gas inlet 4 at the same time with a constant injection speed, meanwhile, detecting pressure change through pressure gauges, wherein the multiple gas sampling ports are used as pressure detection ports; when the first gas outlet 5, the second gas outlet 6, the third gas outlet 7, and the fourth gas outlet 8 start to flow out of gas, and the flow rate remains stable, increasing the pressure of the back pressure valve 33 and increasing the pressure of the gas inlets until the outlet gas flow rate continues to remain stable; repeating the above process until the pressure detected by the pressure gauge rises to the set experimental pressure; after reaching the experimental pressure, closing the back pressure valve 33, the inlets pressure maintains constant till detected pressures of multiple gas sampling ports are the same and all reach the experimental pressure, closing the first gas inlet 1, the second gas inlet 2, the third gas inlet 3 and the fourth gas inlet 4, and stop injection;

S10: after saturating the condensate gas, making the system stand still for 6~8 hours, observing the temperature and pressure changes, adjusting the back pressure valve 33 to release some gas if the cell pressure gets higher than the designed experimental pressure, and stop this step when the temperature and pressure reach the experimental pressure and temperature determined in S1;

S11: keeping only one of the multiple gas sampling ports as the pressure detection port, and the rest as gas sampling ports;

S12: carrying out the displacement experiment, closing the first valve 29, opening the second valve 28, and injecting the injection gas from the second intermediate container 27 into the sand packed model, and in the experiment, the injection gas is injected at a constant speed, the injection speed is 0.1 ml/min~20 ml/min;

S13: during the displacement process, taking samples from other gas sampling ports except the pressure detection port every 2 minutes, and it is noted that the sampled gas is a mixture of injected gas and original condensate gas. Then chromatographic analysis is performed to obtain the gas composition of different sampling ports;

S14: processing the content data determined in S13 to obtain the component distribution of the injected gas at different parts and the component distribution of the condensed gas at different parts; and plotting the data into a cloud chart, and analyzing the migration mechanism through the gas composition at different times.

It will be described below in conjunction with specific embodiments.

In one embodiment, there are 16 gas sampling ports, as shown in FIG. 2, which are A, B, C, D, E, F, H, I, J, K, L, M, N, O, P; gravity differentiation refers to that during the development of condensate gas reservoir, the injected gas will not advance with a vertical front shape due to the density difference between the injected gas and the condensate gas in the reservoir, and will channel from the upper part of the reservoir and arrives at the production well in advance, so that most of the condensate gas is not displaced and remains in the reservoir. In the experiment, by simulating the injection well-production well pattern, the displacing gas was injected from the left end of the model to displace the existed condensate gas in the model. Due to the difference in density between the injected gas and the condensate gas, the overburden phenomenon will occur. The overburden situation is determined by component distribution of the injected gas and the original condensate gas measured by a chromatograph instrument.

The specific determination steps are as follows:

(1) Determining the experimental pressure and temperature, and formulating the experimental scheme.

(2) Checking the air tightness of the measuring device; the step (2) is as follows: firstly, connecting the first gas inlet 1, the second gas inlet 2, the third gas inlet 3 and the fourth gas inlet 4 of the sand packed model with a pressure pump, and closing the first gas outlet 5, the second gas outlet 6, the third gas outlet 7, the fourth gas outlet 8 and the multiple gas sampling ports A, B, C, D, E, F, H, I, J, K, L, M, N, O, P, then slowly pressurizing and injecting gas from the first gas inlet 1, the second gas inlet 2, the third gas inlet 3 and the fourth gas inlet 4, and then closing the pressure pump to observe whether the pressure drops. When the pressure cannot remain stable, it means that the air tightness is poor and measures needs to be taken to detect and eliminate the leakage points. When the air tightness is confirmed, continue to increase pressure, and test the air tightness at higher pressures. The process continues until the test pressure is at least 5 MPa higher than the experiment pressure.

(3) Scaling is performed on the permeability of each layer, the number of layers and the thickness of each layer in the actual formation to obtain the permeability K of each sand layer, the number of sand layers and the thickness of each sand layer in the sand packed model required by the experiment.

(4) Filling the sand packed model according to the permeability K of each sand layer, the number of sand layers and the thickness of each sand layer obtained in step (3).

(5) Filling sand into the sand pack cell 18, filling the first layer of sand with the thickness determined by S4; injecting pressurization medium from the first top pressuring inlet 11 and the second top pressuring inlet 12; pressurizing sand body inside the sand pack cell 18 by the pressure transfer piston 15, wherein the pressurized pressure P needs to ensure that the permeability K of each sand layer is obtained; and after the thickness of the first layer of sand in the sand pack cell 18 reaches the experimentally designed thickness, processing the remaining sand layers according to the procedures of filling the first layer of sand; pressurization is achieved by multiple times, and after each pressurization, thickness of the sand layer is measured; and when the designed thickness is not achieved, the second pressurization is performed and the pressurization process is repeated until the thickness of the first layer in the cell meets the experimental design;

wherein, the top pressure P required to obtain the permeability K of each sand layer is obtained as follows:

(5.1) First obtaining the intermediate parameter a by formula (1), unit: m (meter); wherein, K is the permeability of each sand layer, unit: m$^2$; τ is the tortuosity of the quartz sand formation in the sand packed cell 18, tortuosity is the ratio of the actual flowing length of fluid through the pores to the apparent length of the rock, decimal; r is the radius of the quartz sand particles in the sand layer, the unit is m (meter); wherein, K, τ and r are known parameters;

$$K = \frac{\left(1 - \frac{\frac{4\sqrt{2}}{3}\pi r^3 - 4\sqrt{2}\pi\left(3r - \frac{a}{2}\right)\left(\frac{a}{2}\right)^2}{(2r-a)^3}\right)\left(\frac{2r-a}{\sqrt{3}} - r\right)^2}{8\tau^2}; \qquad (1)$$

(5.2) obtaining F by formula (2), F is the average force applied to a single quartz sand particle, unit: wherein, E is elastic modulus of filled quartz sand, decimal; μ is Poisson's ratio of the quartz sand in sand layer, decimal; E and μ are known parameters;

$$a = \sqrt[3]{\frac{9}{16}\left(\frac{2}{r}\right)\left(2 \times \frac{1-\mu^2}{E}\right)^2 F^2} \; ; \qquad (2)$$

(5.3) obtaining P by formula (3), and unit is Pa;

$$F = P \times 23 r^2 \qquad (3);$$

wherein, r, μ, E are the inherent properties of the filled quartz sand.

(6) Rotating direction control component 9 and adjusting the angle of the sand packed model through the rotating shaft 10 to simulate the real reservoir inclination angle.

(7) Covering the upper cover 19, tightening fixing bolts 14, and testing the air tightness again. The purpose of this step is to eliminate the unassured sealing problems caused by quartz sand detained at joints and contact surfaces among the different parts of the device.

(8) Opening the temperature control system, adjusting the temperature through the temperature control unit 24, and heating the measuring device, to remove the extra moisture in the quartz sand, wherein the heating range is 0° C. to 100° C.

(9) Saturating the experimental gas, turning on the displacement pump 25, opening the first valve 29, and injecting the condensate gas from the first intermediate container 26 into the sand packed model; and to ensure complete saturation, injecting the gas from the first gas inlet 1, the second gas inlet 2, the third gas inlet 3 and the fourth gas inlet 4 at the same time with a constant injection speed, meanwhile, detecting pressure changes through pressure gauges, wherein multiple gas sampling ports A, B, C, D, E, F, Q H, I, J, K, L, M, N, O, P are used as pressure detection ports; when the first gas outlet 5, the second gas outlet 6, the third gas outlet 7, and the fourth gas outlet 8 start to generate gas flow with constant flow rate increasing the pressure of the back pressure valve 33 and increasing the injection pressure at inlets until the outlet gas flow rate remain stable again; repeating the above process until the pressure detected by the pressure gauge rises to the set experimental pressure; after reaching the experimental pressure, closing the back pressure valve 33, the inlets pressure maintains constant till detected pressures of all the gas sampling ports are the same and all reach the experimental pressure, closing the first gas inlet 1, the second gas inlet 2, the third gas inlet 3 and the fourth gas inlet 4, and stop injection.

(10) After saturating the condensate gas, making the experimental system stand still for 6~8 hours, observing the temperature and pressure changes. Due to convection, the temperature field will change. At the same time, the gas will expand at high temperature, which will increase the pressure. When the temperature of the measuring device reaches stability, the pressure will also stabilize. At this time, adjusting the back pressure valve 33 to release some gas if the pressure is higher than the experimental pressure, and stop this step when the temperature and pressure reach the experimental pressure and temperature determined in step (1).

(11) Keeping only one of the multiple gas sampling ports as the pressure detection port, and the rest as gas sampling ports for sampling.

(12) Carrying out the displacement experiment, closing the first valve 29, opening the second valve 28, and injecting the gas from the second intermediate container 27 into the sand packed model. The injection gas is preferably carbon dioxide, nitrogen or methane. In the experiment, the injection gas is injected at a constant speed, and the injection speed ranges from 0.1 ml/min to 20 ml/min.

(13) During the displacement process, taking samples from gas sampling ports every 2 minutes, and it is noted that the sampled gas is a mixture of injected gas and original condensate gas. Then chromatographic analysis is performed to obtain the gas composition of different sampling ports.

Figure 5:
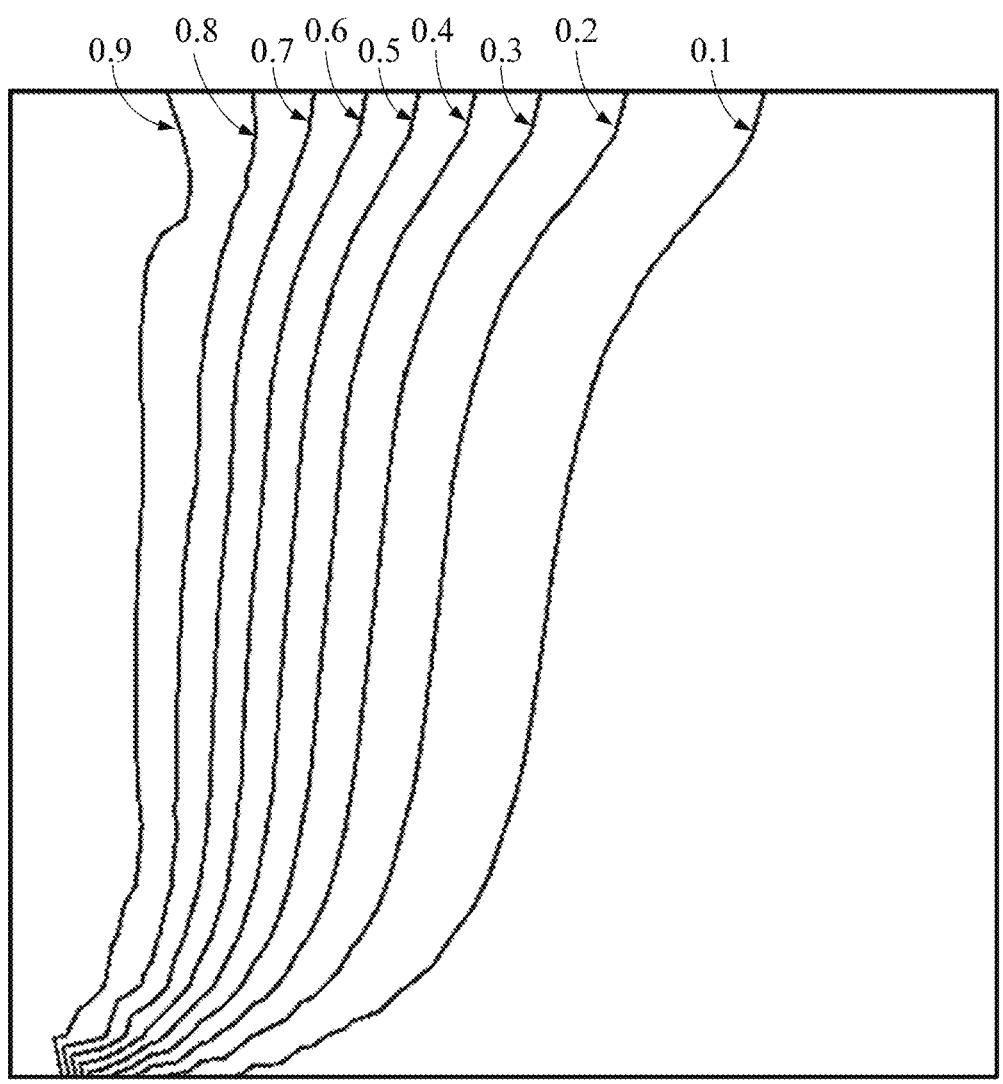
FIG. 5 is a cloud diagram of the component distribution measured at 10 minutes in one embodiment of the present invention.
Figure 6:
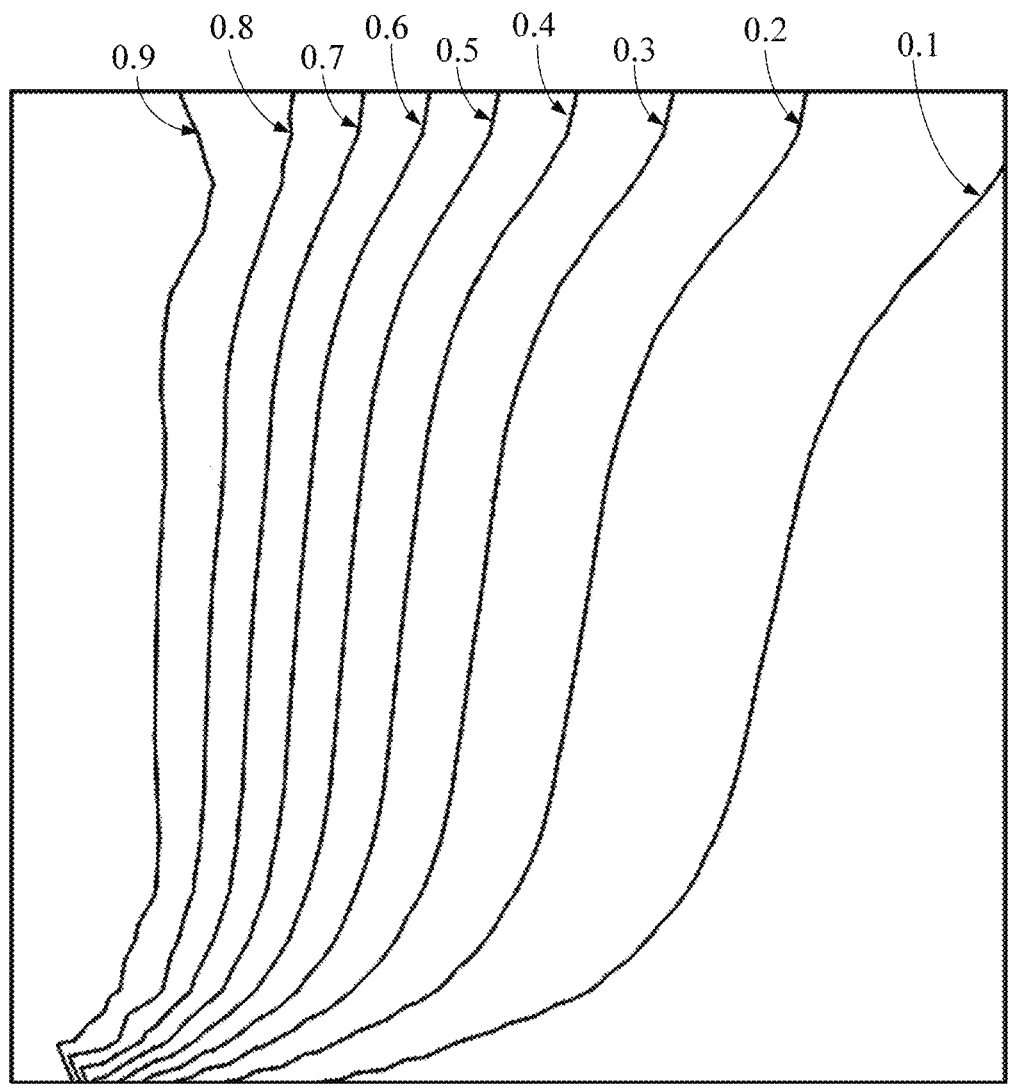
FIG. 6 is a cloud diagram of the component distribution measured at 20 minutes in one embodiment of the present invention.
Figure 7:
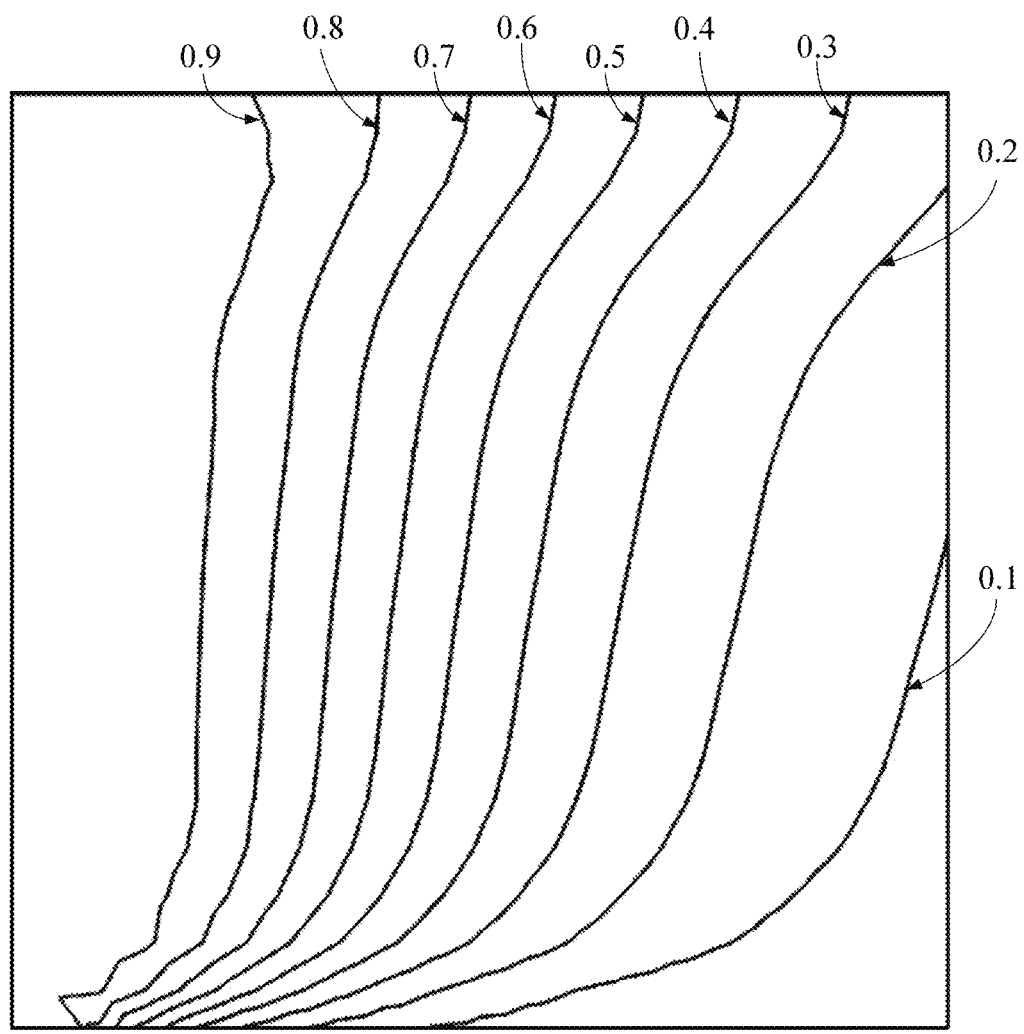
FIG. 7 is a cloud diagram of the component distribution measured at 30 minutes in one embodiment of the present invention.

(14) Processing the content data determined in step (13) by interpolation, the component distribution of the injected gas at different parts and/or the component distribution of the condensate gas at different parts can be obtained. Plotting it into a cloud chart, and analyzing the migration rule through the gas composition at different times. Due to the density difference between the injected gas and the original condensate gas, gravity differentiation will occur, and the composition distribution of the injected gas calculated by interpolation can intuitively exhibit the degree of gravity differentiation. For example, in terms of the component content distribution of the injected gas in FIG. 5, FIG. 6 and FIG. 7, if gravity differentiation does not occur, the contour plot of the injected gas component will move forward in a vertical state, and it is the existence of gravity differentiation that makes the contour map of the injected gas component moves forward in an inclined state.

The above is a preferred embodiment of the present invention. It should be pointed out that for those of ordinary skill in the art, without departing from the principles of the present invention, several improvements and retouches can be made. It should also be regarded as the protection scope of the present invention.

What is claimed is:
1. A device comprising:
a container with a cavity configured to contain sand;
a first gas inlet, a second gas inlet, a third gas inlet, a fourth gas inlet, a first gas outlet, a second gas outlet, a third gas outlet, and a fourth gas outlet, each of which is fluidly connected with the cavity;
a support;
a shaft;
gas sampling ports fluidly connected with the cavity;
a piston in the cavity;
a pressuring inlet configured to apply pneumatic pressure on the piston, thereby pressing the sand in the cavity;
wherein the container is connected to the support through the shaft, and is configured to incline relative to the support by rotating around the shaft.
2. The device according to claim 1, further comprising a temperature control system;
wherein the temperature control system comprises a heating plate, an insulating plate, an insulation material, and a temperature controller;
wherein the heating plate is sheathed outside the container, the insulating plate is sheathed outside the heating plate, and the insulation material is sheathed outside the insulating plate;
wherein the temperature controller is configured to control a temperature of the heating plate;
wherein the insulating plate is configured to electrically insulate the heating plate; and
wherein the insulation material is configured to reduce heat loss.

3. The device according to claim 1, wherein the container comprises an alloy steel with a pressure resistance of 70 MPa.
4. The device according to claim 1, further comprising a gear box configured to drive the shaft.
5. The device according to claim 1, wherein a number of the gas sampling ports is not fewer than 16.
6. The device according to claim 1, further comprising:
a first intermediate container and a second intermediate container, the first intermediate container and the second intermediate container being configured to contain different gases;
a first valve and a second valve;
back pressure valves;
a first pressure gauge and a second pressure gauge;
a first pump fluidly connected with an inlet end of the first intermediate container and an inlet end of the second intermediate container;
a second pump;
wherein an outlet end of the first intermediate container is fluidly connected with an inlet end of the first valve, an outlet end of the second intermediate container is fluidly connected with an inlet end of the second valve, and outlet ends of the first valve and the second valve are fluidly connected with the first gas inlet, the second gas inlet, the third gas inlet and the fourth gas inlet through a first pipeline;
wherein the first pressure gauge is configured to measure pressure in the first pipeline;
wherein the first gas outlet, the second gas outlet, the third gas outlet and the fourth gas outlet are fluidly connected with the back pressure valves;
wherein the back pressure valves are configured to control a gas outflow rate at the first gas outlet, the second gas outlet, the third gas outlet and the fourth gas outlet;
wherein the back pressure valves are fluidly connected with the second pump through a second pipeline; and
wherein the second pressure gauge is configured to measure pressure in the second pipeline.
7. The device according to claim 6, wherein the second intermediate container is configured to contain carbon dioxide, nitrogen, methane or any mixture thereof.
8. The device according to claim 1, further comprising a rod, an upper cover and a lower cover;
wherein the upper cover and the lower cover are respectively fixed on an upper end and a lower end of the cavity, and configured to seal the cavity;
wherein the rod is connected to the piston, configured to slide through a hole in the upper cover, and configured to prevent the piston from tilting.
9. A method of using the device of claim 1, comprising:
loading the cavity with a layer of sand with a predetermined permeability K and a predetermined thickness, by pressing the layer of sand with the piston;
adjusting inclination of the container;
sealing the cavity;
heating the sand to a predetermined temperature;
saturating the sand with a first gas to a predetermined pressure, by injecting the first gas into the cavity through the first gas inlet, the second gas inlet, the third gas inlet and the fourth gas inlet;
stopping injection of the first gas into the cavity;
injecting a second gas into the cavity through the first gas inlet, the second gas inlet, the third gas inlet and the fourth gas inlet;
during injection of the second gas, taking samples from the gas sampling ports;

determining compositions of the samples; and determining gas transport characteristics of the layer of sand based on the compositions.

10. The method of claim 8, further comprising determining a pressure P at which the layer of sand is pressed with the piston, based on the predetermined permeability K, using formulas (1)-(3):

$$K = \frac{\left(1 - \frac{\frac{4\sqrt{2}}{3}\pi r^3 - 4\sqrt{2}\pi\left(3r - \frac{a}{2}\right)\left(\frac{a}{2}\right)^2}{(2r-a)^3}\right)\left(\frac{2r-a}{\sqrt{3}} - r\right)^2}{8\tau^2}; \quad (1)$$

$$a = \sqrt[3]{\frac{9}{16}\left(\frac{2}{r}\right)\left(2 \times \frac{1-\mu^2}{E}\right)^2 F^2}; \quad (2)$$

$$F = P \times 2\sqrt{3}r^2 \quad (3);$$

wherein $\tau$ is a tortuosity of the sand;

wherein r is a radius of sand particles of the sand;

wherein F is an average force applied to a single sand particle;

wherein E is an elastic modulus of the sand;

wherein $\mu$ is Poisson's ratio of the sand.

\* \* \* \* \*